Patented Oct. 12, 1954

2,691,582

UNITED STATES PATENT OFFICE 2,691,582

PEPTIZING OF SILVER HALIDES WITH OXIDIZED PROTEINS OR OXIDIZED PROTEIN DERIVATIVES

Wesley G. Lowe and John W. Gates, Jr., Rochester, N. Y., assignors to Eastman Kodak Company, Rochester, N. Y., a corporation of New Jersey No Drawing. Application August 13, 1947, Serial No. 768,480

14 Claims. (Cl. 95—7)

This invention relates to the use in the preparation of silver-halide dispersions of peptizers consisting of oxidized proteins or oxidized protein derivatives. This invention also relates to the preparation of the oxidized proteins or protein derivatives with hydrogen peroxide.

Heretofore with but few exceptions the preparation of silver-halide dispersions has been in the presence of gelatin as a peptizer therefor. In that prior procedure the silver-halide dispersion was prepared using gelatin as the peptizer, which was then mixed with further gelatin as the vehicle for the silver halide in the preparation of photographic emulsions. In view, however, of the recent interest in the use of other vehicles for photographic emulsions than gelatin, investigation has been directed to other peptizers than gelatin since gelatin exhibits poor compatibility with various materials which have been considered as useful for photographic vehicles. Other proteins than gelatin have heretofore been regarded as unsuitable for peptizing silver halides in view of the various deleterious characteristics of the proteins for photographic purposes. For instance, other proteins than gelatin have been considered objectionable for photographic uses due to the relatively large percentages of sulfur contained therein. Other disadvantages of the various proteins are that some exhibit uncontrolled sulfur sensitizing or excessive fog, while some exhibit ripening restraint and anti-sensitizing action. Also, these proteins other than gelatin frequently exhibit solubility properties such that the peptizing procedure can only be carried out under special conditions such as the use of high pH. Also, the compatibility of proteins with materials considered as useful for vehicles for photographic emulsions has been poor in many cases.

One object of our invention is to provide proteins other than gelatin which are suitable for use as peptizers in the preparation of silver-halide dispersions. Another object of our invention is to provide protein peptizers for silver halide which are not objectionable because of fogging or restraining actions on Ostwald ripening and sensitizing. A further object of our invention is to provide peptizers for silver halides which are compatible with polyvinyl alcohol or other materials which are useful as vehicles in photographic emulsions. A still further object of our invention is to prepare proteins useful as peptizers by subjecting them to oxidation with hydrogen peroxide. Other objects of our invention will appear herein.

We have found that proteins which have been considered heretofore as unsuitable as peptizers for silver halides may in modified form be employed as peptizers and exhibit properties rendering those materials useful for preparing silver-halide dispersions. We have found that proteins which have been heretofore considered objectionable due to high sulfur content and pronounced ripening restraint and anti-sensitizing action are eminently suitable for peptizing silver halides if derivatives are prepared from those proteins and those derivatives are subjected to oxidation with hydrogen peroxide. If the oxidation is carried out at a lower temperature, such as in the vicinity of 85–90° F., oxidation occurs with slight hydrolysis. If, however, the oxidation is carried out at a more elevated temperature, such as 140–150° F., more extensive hydrolysis occurs and better peptizing action is usually exhibited.

In preparing proteins which are suitable for peptizing agents the proteins may, if desired, be treated with Raney nickel or some other like metal, such as described and claimed in Damschroder and Kauffman application, Ser. No. 697,156. The protein may then be formed into a derivative and subjected to an oxidation or an oxidative hydrolysis with hydrogen peroxide, or the protein may be oxidized or oxidatively hydrolyzed with hydrogen peroxide and then converted into a protein derivative. The protein derivative is prepared by reacting the protein with a derivative former at an elevated pH for a sufficient time to alter the isoelectric point and various other properties of the protein. For instance, casein may be converted to a casein derivative by reacting thereon at a pH of 8.5–12 in aqueous solution with a derivative-forming reagent until the desired product is obtained. Derivative-formers which may be employed to form protein derivatives as referred to herein are as follows:

*Sulfonyl chlorides*

Benzene sulfonyl chloride
p-Methoxybenzene sulfonyl chloride
p-Phenoxybenzene sulfonyl chloride
p-Bromobenzene sulfonyl chloride
p-Toluene sulfonyl chloride
m-Nitrobenzene sulfonyl chloride
m-Sulfobenzoyl dichloride
Naphthalene-$\beta$-sulfonyl chloride
p-Chlorobenzene sulfonyl chloride
3-nitro-4-aminobenzene sulfonyl chloride
m-Carboxy-4-bromobenzene sulfonyl chloride
1-chlorosulfonyl-2-hydroxy-3-naphthoic acid
Quinoline-8-sulfonyl chloride
m-Carboxybenzene sulfonyl chloride
2-amino-5-methylbenzene-sulfonyl chloride

*Carboxylic acid chlorides*

Phthalyl chloride
p-Nitrobenzoyl chloride
Benzoyl chloride
Ethyl chlorocarbonate
Furoyl chloride

*Acid anhydrides*

Phthalic anhydride
Benzoic anhydride
Succinic anhydride
Maleic anhydride
Isatoic anhydride
Adipic anhydride
Glutaric anhydride
Acetic anhydride
Methacrylic anhydride

*Isocyanates*

Phenyl isocyanate
p-Bromophenyl isocyanate
p-Chlorophenyl isocyanate
p-Tolyl isocyanate
p-Nitrophenyl isocyanate
$\alpha$-Naphthyl isocyanate
$\beta$-Naphthyl isocyanate

*1,4-diketones*

Acetonyl acetone
Dimethyl acetonyl acetone

*Nitriles*

Acrylonitrile

As there are competitive reactions occurring, namely, the reaction between water and acid anhydride or other derivative-former and the protein and the derivative former, it is desirable that the reaction be carried out under the most favorable conditions, such as with the use of only sufficient water to promote the reaction. The oxidation procedure is carried out by treating the protein, such as casein, in aqueous solution with hydrogen peroxide at an elevated temperature and pH, which action converts any sulfur-containing groups in the protein to an inactive form or else removes those groups from the protein material. If this treatment is carried out at an elevated temperature, such as 140–150° F., the material obtained not only shows good solubilities and a minimum development restraint but also exhibits a high compatibility and a minimum resistance toward ripening and sulfur sensitizing. Also, this material is resistant to the formation of fog which characterizes it as distinguished from the usual proteins.

Our invention relates to proteins other than gelatin which are insoluble in water at a normal pH (a pH of 7) although many of these proteins are soluble at an alkaline pH. Proteins which are representative of this type and which are commonly available and commercially practicable are casein, soybean protein, blood albumin, egg albumin, castor bean protein, globulin, and edestin.

The following examples illustrate the preparation of modified proteins which are useful in accordance with our invention. It is to be understood that the protein derivatives which have been both oxidized and hydrolyzed exhibit the best peptizing properties although both the proteins which have been oxidized and their derivatives are useful in this connection.

*Example 1.*—A solution of 100 parts of casein in 900 parts of water at a pH of 10.5 and a temperature of 110° F. was treated dropwise at constant pH with 20 parts of acetic anhydride over a period of fifteen minutes. At the end of this addition the stirred solution was treated with 20 parts of acrylonitrile and held at 110–120° F. for two hours, chilled to 85–90° F. and then oxidized by adding 20 parts of 30% hydrogen peroxide and holding for one hour. The casein was oxidized thereby. The casein was then coagulated by the addition of dilute sulfuric acid to a pH of 3, and the precipitate was thoroughly washed with water. The precipitate was then dissolved in one liter of water at a pH of 10 and a temperature of 110° F. and was stirred for ten to twenty minutes with a small portion of Raney nickel catalyst whereupon the catalyst was separated from the liquid. The liquid was acidulated to a pH of 3 with sulfuric acid which coagulated the casein derivative and the precipitate was water-washed. The precipitate was then dried and stored in a suitable place. The coagulation point of the resulting material was 4.2 to 3.9. A quantitative yield was obtained.

Similar derivatives of blood albumin and the soybean protein were obtained by this procedure.

*Example 2.*—Acrylonitrile casein was prepared by stirring a solution of 200 parts of casein in 1800 parts of water at a pH of 10.5 and a temperature of 110° F. for two hours with 40 parts of acrylonitrile. The mass was chilled to 85–90° F., and the product was oxidized with 40 parts of 30% hydrogen peroxide and was then coagulated by adding dilute sulfuric acid to the mass to bring down the pH to 3.

*Example 3.*—This is an example of casein which is subjected to oxidizing without first preparing the derivative of the casein. 450 parts of casein in an excess of dilute alkali having a pH of 10.5 were oxidized at 85–90° F. with 90 parts of 30% hydrogen peroxide for one hour and were coagulated by the addition of dilute sulfuric acid to impart a pH of 3. A white curdy precipitate was obtained which was washed with distilled water and then re-dissolved at a pH of 10 and was treated at 110° F. with a small amount of Raney nickel in finely divided form for ten minutes whereupon the mass was filtered and again coagulated and washed. The precipitate coagulates at pH 5.5 and may be stored in the form of a 20% solution at a pH of 6.5. If desired, the temperature of oxidation may be increased, such as to 120–150° F. to give a lower viscosity material. In a similar manner blood albumin and soybean protein may be oxidized to render those materials suitable for use either as peptizing agents or for use as the starting material in preparing protein derivatives which are eminently suited for preparing peptized silver-halide dispersions. These oxidized proteins are also suitable for use as vehicles in photographic emulsions and are hardenable with formaldehyde. If desired, instead of the derivatives specified, other derivatives of the proteins may be prepared by the standard Schotten and Baumann procedure at pH's of 9.5–10.5 held constant by the addition of dilute alkali using anhydrides or acid chlorides generally as the esterifying agents for the proteins.

Our invention is carried out by reacting a soluble silver salt and a soluble halide in an aqueous solution of the peptizing material which here may be either an oxidized protein or an oxidized derivative of a protein which proteins are water-insoluble at a pH of 7 but will dissolve at a pH of 9–11. The preparation of the silver-halide dispersion may be carried out either by running solutions of the silver salt and the halide salt simultaneously into a solution of the peptizing agent or by running a solution of the silver salt into a solution of the peptizing agent containing the water-soluble halide. For instance, in accordance with my invention silver-halide dispersions may be prepared by contacting an aqueous solution of silver nitrate and an aqueous solution of potassium bromide or chloride in an aqueous solution of oxidized casein or an oxidized casein derivative accompanied by rapid stirring of the peptizing solution. After the dispersion is formed and washed as described herein, it may be mixed with the photographic emulsion vehicle, such as gelatin, polyvinyl alcohol or a cellulose ester of a water-soluble type.

Some derivatives of casein which are quite satisfactory for peptizing silver halide in its preparation are those containing the indicated percentages of groups therein as follows:

| Derivative | Treatment | Coagulation, pH |
|---|---|---|
| 10% Methacrylyl, 20% Acrylonitrile | Oxidative hydrolysis | 5.0 |
| 20% Acrylonitrile | do | 6.5 |
| 10% Acetyl, 20% Acrylonitrile | do | 4.3 |
| 10% phthalic Anh., 20% Acrylonitrile | do | 3.5 |

These casein derivatives are readily soluble in water at pH's above the coagulation pH indicated. Dispersions are prepared therewith by running solutions of AgNO₃ and potassium chloride or bromide simultaneously into the solution of the colloid with stirring or by dissolving the potassium chloride or bromide in the colloid solution and running the solution of silver nitrate into the mixture with stirring. In this way dispersions are obtained from which emulsions may be prepared having speed, gamma and fog characteristics very similar to those obtained using gelatin or gelatin derivatives. Emulsions so obtained can be precipitated by the addition of acid, washed, re-dispersed and added to a suitable vehicle for coating on film or paper. If desired, a casein derivative may be employed as the vehicle for the emulsion which can be coated on paper in the unwashed condition.

Listed below are blood albumin derivatives which have been found eminently suitable as peptizers in preparing silver-halide dispersions, the derivatives being indicated by the percentage of groups which have been added onto the blood albumin:

| Derivative | Treatment | Coagulation, pH |
|---|---|---|
| 10% phthalic anhydride, 20% acrylonitrile | 1 hr. oxidation at 85–90° F | 4.0 |
| | do | 4.6 |
| 10% acetyl | do | 4.5 |
| None | do | 5.5 |

These colloids are employed for peptizing silver halides in the same manner as described above for the derivatives of casein. They show a similar compatibility with polyvinyl alcohol, gelatin and other protein-type vehicles after washing, or can be coated in the unwashed condition on paper using a vehicle of a blood albumin derivative. Such coatings may also be hardened with formaldehyde or similar hardener, if desired, to avoid excessive softening during processing.

Some soybean protein derivatives which have been found to be eminently suitable for use as peptizers in the preparation of silver-halide dispersions are as follows:

| Derivative | Treatment | Coagulation, pH |
|---|---|---|
| 10% acetyl | 1 hr. oxidation at 85–90° F | 4.6 |
| 10% acetyl, 20% acrylonitrile | do | 4.2 |

These peptizers are similar in properties to the derivatives of casein and blood albumin, but it is desirable when using these peptizers with a soybean protein vehicle that plasticizer be incorporated therein to reduce brittleness, particularly when employed in the preparation of photographic paper.

*Example 4.*—This example illustrates the preparation of the derivatives of other proteins than casein. Although the example uses blood albumin, other proteins such as soybean albumin, egg albumin, globulin, or edestin might be employed. 25 parts of blood albumin were dispersed in water at a pH of 10 and a temperature of 110–120° F. and were treated with 2.5 parts of phthalic anhydride at a constant pH. After running the reaction for two hours the mass was then cooled to 85–90° F. and the product was oxidized with 10 parts of 30% hydrogen peroxide for one hour. The derivative obtained was coagulated by the addition of dilute sulfuric acid to a pH of 4.5–4.2. This product was washed with distilled water.

Although in the various examples the oxidation of the protein derivatives has been with hydrogen peroxide of 30% strength, there is no significance in the use of this particular concentration, this being the strength in which it is marketed commercially. Therefore, in practical operations 30% concentration peroxide would be employed. However, other concentrations of hydrogen peroxide may be used for this oxidation step if for any reason the use of a 30% concentration is undesirable or inconvenient.

Examples will now be given of the preparation of photographic emulsions using oxidized or oxidized and hydrolyzed protein derivatives as the peptizer.

*Example 5.*—Solution A was prepared consisting of 12.9 g. of a casein derivative prepared in accordance with the description of Example 1, 83.5 g. of potassium bromide, 1.1 g. of potassium iodide, and 725 cc. of water. This solution was adjusted to a pH of 6 and heated to 60° C. Solution B consisting of 100 g. of silver nitrate and 620 cc. of water was prepared. Solution B was heated to 40° C. and allowed to run into solution A in six to seven minutes with good stirring. The emulsion was then cooled to 40° C. and sulfuric acid was added until the pH of the emulsion was 3.5. The emulsion grains coagulated and settled. They were washed by pouring off the supernatant liquid, adding fresh water, stirring and again allowing the grains to settle. This process was repeated until four changes of water had been made. The washed grains were then diluted with water to a volume of 500 cc. and sodium hydroxide was added to raise the pH above the coagulation point of the casein derivative. The grains were re-peptized by stirring for fifteen minutes at 50° C. and at a pH of 6–7. The pH was adjusted to 6 and a small quantity of potassium bromide was added. There was then added a small quantity of allyl thiourea which is a compound containing labile sulfur (that is, a compound capable of yielding silver sulfide on reaction with a silver salt such as silver bromide). The emulsion was heated to 55° C. and maintained at this temperature until test coatings made by adding portions of the emulsion to the vehicle at 40° C. and coating on plates and testing sensitometrically gave optimum speed and contrast with practicable fog values. The amount of the sulfur compound added usually lies within the range of 1–25 mg. but is best selected by its photographic behavior as is well known in the art. After testing satisfactorily the heat treated emulsion was cooled to 40° C. and added to two liters of 5% polyvinyl alcohol (viscosity 80 seconds); 140 cc. of 4% borax (adjusted to a pH of 5.5) was added and the emulsion was coated onto a photographic film base and set by fuming with ammonia. The emulsion obtained was found to have good speed and photographic quality and was readily processed in conventional developing and fixing baths. Instead of a polyvinyl alcohol vehicle gelatin may be used as a vehicle, the silver-halide dispersion being added to two liters of 5% gelatin solution and the emulsion coated onto photographic film base and set by chilling. If desired, modified protein vehicles may be employed. For instance, casein, either as such, or in the form of its derivative which has been subjected to oxidation with hydrogen peroxide may be employed as the vehicle. For optimum compatibility, it is preferable to coat the grains peptized with casein derivatives in an oxidized casein or casein derivative vehicle.

In Example 5, instead of casein derivative, the oxidized protein derivatives of other materials than casein might be employed as the peptizing agent. For instance, any of the blood albumin derivatives listed in column 5, or the soybean derivatives listed in column 6 might be employed as the peptizing material following the procedure described in Example 5. It is desirable, however, that in the case of the silver-halide dispersions peptized with blood albumin derivative that oxidized blood albumin or blood albumin derivative be employed as the vehicle if a modified protein vehicle is employed. It is desirable that in the use of modified protein vehicles that a modified vehicle corresponding in a general way to the peptizing agent used be employed. As these modified protein vehicles do not chill set, the dispersed silver halide, as described in the above examples, is added to a concentrated solution of the modified protein vehicle, such as to one liter of 20% modified protein. 5 cc. of 20% formaldehyde is then added as the hardener and the emulsion may then be coated upon a suitable support, such as a photographic film base, and dried down on the support without any attempt being made to chill set. Photographic products of good quality are thereby obtained.

Although in the oxidation of proteins insoluble in water at normal pH, with hydrogen peroxide, it is usually desirable to operate either at a temperature of 85–90° F. if only oxidation is desired, or at 140–150° F. if oxidation and hydrolysis both are desired, nevertheless, intermediate temperatures between these two ranges may be employed for the oxidation, if desired, although the amount of hydrolysis obtained will be less as the temperature employed approaches the 85–90° F. temperature range. It is to be understood that in the preparation of silver-halide dispersions and in the use of those dispersions for preparing photographic emulsions that the reactions are carried out under darkened conditions to reduce to a minimum the action of light-sensitive silver halide which is prepared.

We claim:

1. A method of preparing silver halide dispersions which comprises reacting a water-soluble silver salt with a water-soluble halide salt in an aqueous solution of a material selected from the group consisting of (1) casein, soy protein, blood albumin, egg albumin, castor bean protein, globulin and edestin, which proteins have been oxidized with hydrogen peroxide, (2) the aromatic sulfonyl chloride derivatives of those oxidized proteins, the carboxylic acid chloride derivatives of those oxidized proteins, the carboxylic acid anhydride derivatives of those oxidized proteins, the aromatic isocyanate derivatives of those oxidized proteins, the 1,4-diketone derivatives of those oxidized proteins, the acrylonitrile derivatives of those oxidized proteins, and (3) the protein compounds after oxidizing with hydrogen peroxide consisting of the aromatic sulfonyl chloride derivatives of casein, soy protein, blood albumin, egg albumin, castor bean protein, globulin and edestin, the carboxylic acid chloride derivatives of casein, soy protein, blood albumin, egg albumin, castor bean protein, globulin and edestin, the carboxylic acid anhydride derivatives of casein, soy protein, blood albumin, egg albumin, castor bean protein, globulin and edestin, the aromatic isocyanate derivatives of casein, soy protein, blood albumin, egg albumin, castor bean protein, globulin and edestin, the 1,4-diketone derivatives of casein, soy protein, blood albumin, egg albumin, castor bean protein, globulin and edestin, and the acrylonitrile derivatives of casein, soy protein, blood albumin, egg albumin, castor bean protein, globulin and edestin.

2. A method of preparing silver halide dispersions which comprises reacting a water-soluble silver salt with a water-soluble halide salt in an aqueous solution of a material after it has been oxidized with hydrogen peroxide selected from the group consisting of casein, soy protein, blood albumin, egg albumin, castor bean protein, globulin, edestin.

3. A method of preparing silver halide dispersions which comprises reacting a water soluble silver salt with a water soluble halide salt in an aqueous solution of a protein material which has been oxidized with hydrogen peroxide selected from the group consisting of the aromatic sulfonyl chloride derivatives of casein, soy protein, blood albumin, egg albumin, castor bean protein, globulin and edestin, the carboxylic acid chloride derivatives of casein, soy protein, blood albumin, egg albumin, castor bean protein, globulin and edestin, the carboxylic acid anhydride derivatives of casein, soy protein, blood albumin, egg albumin, castor bean protein, globulin and edestin, the aromatic isocyanate derivatives of casein, soy protein, blood albumin, egg albumin, castor bean protein, globulin and edestin, the 1,4-diketone derivatives of casein, soy protein, blood albumin, egg albumin, castor bean protein, globulin and edestin, and the acrylonitrile derivatives of casein, soy protein, blood albumin, egg albumin, castor bean protein, globulin and edestin.

4. A dispersion of silver halide in an aqueous solution of a material selected from the group consisting of (1) casein, soy protein, blood albumin, egg albumin, castor bean protein, globulin and edestin, which proteins have been oxidized with hydrogen peroxide, (2) the aromatic sulfonyl chloride derivatives of those oxidized proteins, the carboxylic acid chloride derivatives of those oxidized proteins, the carboxylic acid anhydride derivatives of those oxidized proteins, the aromatic isocyanate derivatives of those oxidized proteins, the 1,4-diketone derivatives of those oxidized proteins, the acrylonitrile derivatives of those oxidized proteins, and (3) the protein compounds after oxidizing with hydrogen peroxide consisting of the aromatic sulfonyl chloride derivatives of casein, soy protein, blood albumin, egg albumin, castor bean protein, globulin and edestin, the carboxylic acid chloride derivatives of casein, soy protein, blood albumin, egg albumin, castor bean protein, globulin and edestin, the carboxylic acid anhydride derivatives of casein, soy protein, blood albumin, egg albumin, castor bean protein, globulin and edestin, the aromatic isocyanate derivatives of casein, soy protein, blood albumin, egg albumin, castor bean protein, globulin and edestin, the 1,4-diketone derivatives of casein, soy protein, blood albumin, egg albumin, castor bean protein, globulin and edestin, and the acrylonitrile derivatives of casein, soy protein, blood albumin, egg albumin, castor bean protein, globulin and edestin.

5. A dispersion of silver halide in an acrylonitrile derivatives of casein which has been oxidized with hydrogen peroxide.

6. A dispersion of silver halide in an aqueous solution of a casein material which casein material has been oxidized with hydrogen peroxide.

7. A method of preparing silver halide dispersions which comprises reacting silver nitrate with an alkali metal halide in an aqueous solution of a phthalic anhydride derivative of blood albumin which derivative has been oxidized with hydrogen peroxide.

8. A dispersion of silver halide in a phthalic anhydride derivative of blood albumin which derivative has been oxidized with hydrogen peroxide.

9. A method of preparing silver halide dispersions which comprises reacting silver nitrate with an alkali metal halide in an aqueous solution of a mixed acetyl-acrylonitrile derivative of casein, which derivative has been oxidized with hydrogen peroxide.

10. A dispersion of silver halide in an acetyl-acrylonitrile derivative of casein which derivative has been oxidized with hydrogen peroxide.

11. A method of preparing silver halide dispersions which comprises reacting silver nitrate with an alkali metal halide in an aqueous solution of an acetyl derivative of casein which derivative has been oxidized with a hydrogen peroxide.

12. A dispersion of silver halide in an acetyl derivative of casein which derivative has been oxidized with hydrogen peroxide.

13. A method of preparing silver-halide dispersions which comprises reacting silver nitrate with an alkali metal halide in an aqueous solution of a casein material which casein material has been oxidized with hydrogen peroxide.

14. A method of preparing silver halide dispersions which comprises reacting silver nitrate with an alkali metal halide in an aqueous solution of an acrylonitrile derivative of casein which has been oxidized with hydrogen peroxide.

References Cited in the file of this patent

UNITED STATES PATENTS

| Number | Name | Date |
|---|---|---|
| 797,458 | Rompler | Aug. 15, 1905 |
| 967,584 | Tambach | Aug. 16, 1910 |
| 1,896,300 | Germann | Feb. 7, 1933 |
| 2,245,610 | Schaffer et al. | June 17, 1941 |
| 2,305,745 | Stasiw | Dec. 22, 1942 |
| 2,311,059 | Lowe | Feb. 16, 1943 |
| 2,343,650 | Fallesen | Mar. 7, 1944 |
| 2,401,051 | Crouse et al. | May 28, 1946 |
| 2,414,207 | Lowe | Jan. 14, 1947 |
| 2,436,138 | Cairns | Feb. 17, 1948 |

OTHER REFERENCES

Sheppard: Gelatine in Photography (1923), pub. Van Nostrand Co. N. Y., N. Y., pages 32, 82 and 153.

Clark: The Photographic Journal (August 1924), vol. 64, page 366.

The Amateur Photographer, vol. 18, October 6, 1893, pages 342–344.